(12) United States Patent
Better et al.

(10) Patent No.: US 7,489,249 B2
(45) Date of Patent: Feb. 10, 2009

(54) APPARATUS AND METHOD FOR DETERMINING THE ATTITUDE OF A REMOTELY MONITORED DEVICE

(75) Inventors: Gil Better, Shoam (IL); Gil Gemer, Nirit (IL); Guy Greitser, Haifa (IL); Dan Zeeli, Rishon le Zion (IL)

(73) Assignee: DMATEK Ltd., Tel Aviv (IL)

( * ) Notice: Subject to any disclaimer, the term of this patent is extended or adjusted under 35 U.S.C. 154(b) by 196 days.

(21) Appl. No.: 11/202,629

(22) Filed: Aug. 11, 2005

(65) Prior Publication Data

US 2008/0057855 A1    Mar. 6, 2008

(51) Int. Cl.
*G08B 23/00*    (2006.01)

(52) U.S. Cl. .................... 340/573.1; 340/573.4

(58) Field of Classification Search .............. 340/573.1, 340/573.4, 686.1, 689; 33/365, 340–343, 33/366.1
See application file for complete search history.

(56) References Cited

U.S. PATENT DOCUMENTS 7,210,240 B2 * 5/2007 Townsend et al. ............. 33/512
2006/0238347 A1 * 10/2006 Parkinson et al. ........ 340/572.4

* cited by examiner

*Primary Examiner*—George A Bugg
*Assistant Examiner*—Shirley Lu
(74) *Attorney, Agent, or Firm*—Ladas & Parry, LLP

(57) ABSTRACT

An apparatus and method for the determination of the attitude of a remotely monitored device attached or non-attached to the body of a remotely monitored person is disclosed. The device attitude is determined by two tilt-over switches having pre-defined operating angles that operate in combination. Periodically, indication concerning the number degrees of inclination measured by two tilt-over switches is obtained and a device attitude monitoring calculation is performed based on the indications.

18 Claims, 6 Drawing Sheets

MAXIMUM OPERATING ANGLE A

MAXIMUM OPERATING ANGLE B

APPARATUS AND METHOD FOR DETERMINING THE ATTITUDE OF A REMOTELY MONITORED DEVICE

BACKGROUND OF THE INVENTION

1. Field of the Invention

The present invention relates to an apparatus and method for remote tracking and monitoring of persons and more particularly to attitude determination of a remotely monitored device which is periodically or permanently attached to the body of a monitored person.

2. Discussion of the Related Art

Currently, remote tracking and monitoring of persons are achieved via the utilization of radio and cellular technologies. Typically, a body-worn electronic tag and an optional tracking, processing and reporting device that communicates with the electronic tag, are attached to the monitored person's body, where the tag or the associated tracking device is periodically or continuously broadcasts a radio signal to a local or remote monitoring station via a cellular site. The signal includes tracking information in encoded format where the information could contain one or more types of tracking data, such as location data, and/or device attitude data where the device is periodically or permanently attached to the body of the monitored person. Location data indicates the geographical location of the monitored device while attitude data indicates the position of the monitored device relative to a frame of reference, such as the vertical-horizontal axis. In accordance with the specific application, the apparatus could be adapted to handle different types of relevant tracking information. Thus, for example, a legally movement-restricted or location-restricted person, such as a convicted criminal offender under house arrest, could be monitored by the collection of both location data and attitude data in order to make sure that location-restriction or movement-restriction order is properly maintained Location data could be determined either in accordance with the identification of the signaling path, through cellular or Global Positioning System satellites (GPS)-assisted triangulation techniques, or other location-finding techniques while device attitude data could be collected by specialized electromechanical devices such as inertial measurement devices, or tip-over switches.

Device attitude represents the position or the arrangement of either a non-attached or a body-attached device when situated in space relative to the vertical-horizontal axis frame. In remote personal tracking and monitoring systems a device attitude detector and indicator is an electromechanical apparatus that detects the attitude of a non-attached or body-attached device relative to a frame of reference, such as the vertical-horizontal axis, and informs the monitoring station of the detected attitude. The device attitude detector apparatus is typically used for detecting and indicating whether the non-attached monitored device or the body-attached device and therefore the body of the monitored person to which the device is attached is in a standing position (vertical) or in a lying down position (horizontal). The known instruments used for attitude detection are multi-axis motion sensors, such as traditional gyroscopes (gyros), inertial measurement units (IMUs) or solid-state miniature tri-axial gyroscopes. In some remote personal tracking and monitoring systems 3 degrees of freedom motion sensors are used to assist in determining if the unit is in motion. Determining whether the unit is in motion is important from a number of reasons. One of the reasons is to determine the location of the tracked individual through receiving GPS data associated with the individual location. Another reason is to conserve battery power by changing the GPS mode to a battery conserving mode if the individual is not in motion. There are number disadvantages in the above now used devices. One disadvantage lies in the sensitivity of such sensors, whereby each movement would trigger the device to determine that the individual being tracked is moving, while in fact, such individual has not moved at all. Another disadvantage lies in the fact that now used sensors, which do not comprise inertial detectors, are not likely to detect very slow movement. Thus, an offender may move around very slowly without activating the GPS and thus will be able to change his position without detection. As a result using these devices in human personal monitoring where the requirements for attitude information are considerably simpler is not cost effective and is too cumbersome. There is therefore a need in the art to provide a simple and cost effective mechanism which will be effective in determining when an individual being monitored using a GPS tracking and monitoring unit has moved from one location to another, while activating the unit's GPS only when necessary.

SUMMARY OF THE PRESENT INVENTION

One aspect of the present invention regards an apparatus for the determination of the attitude of a device permanently or periodically attached to the body of a remotely monitored person relative to the vertical or horizontal axis frame. The apparatus comprises: a first tip-over switch to measure the number of degrees of inclination of the device non- attached or attached to the body of the monitored person relative to the vertical or the horizontal axis and to generate and output a value according to a pre-defined first number of degrees of inclination, a second tip-over switch to measure the degrees of inclination of the device non-attached or attached to the body of the monitored person relative to the vertical or the horizontal axis and to generate and output a value according to a pre-defined second number of degrees of inclination and a device attitude calculator module to receive the value generated by the first tip-over switch, to receive the value generated by the second tip-over switch, to collect the values received from the second tip-over switch, to manipulate a tip-over transitions counter, to manipulate a tip-over counter, and to perform a device attitude change calculation in order to determine the orientation of the device non-attached or attached to the body of the monitored person.

A second aspect of the present invention regards a method for the determination of the attitude of a remotely monitored device non-attached or attached to the body of a monitored person relative to the vertical or horizontal axis frame. The method comprises: obtaining a pre-defined number of state readouts of a first tip-over switch to determine the number of tip-over state changes as measured by the first tip-over switch during a pre-defined period, obtaining a tip-over state reading of a second tip-over switch to determine the tip-over state of the second tip-over switch during a pre-defined period, manipulating a tip-over counter during a pre-defined period based on the collected number of tip-over state changes of the first tip-over switch, the tip-over state of the second tip-over switch and the pre-loaded parameter values, and performing device attitude change calculation during the pre-defined period based on the value of the tip-over counter, the tip-over state of the first tip-over switch, the number of tip-over state changes of the second tip-over switch during the pre-defined period and the value of the pre-loaded tip-over parameters.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention provides a tracking and monitoring apparatus and method to be operated mainly in law enforcement and offender tracking and monitoring, which overcomes the disadvantages of the prior art. The present system can be used in the context of tracking of individuals in other settings.

The invention provides for a "Virtual Docking Station" mechanism, that enables full control over offenders or tracked individuals in situations where GPS reception is not available or where GPS usage and energy consumption should be limited through providing a combination of two tip-over switches and a controller. In remote personal tracking and monitoring systems a "Virtual Docking Station" is an electromechanical apparatus that detects the attitude of the unit of a monitored person relative to a frame of reference, such as the vertical-horizontal axis, and informs the monitoring station of the detected attitude. The invention is typically used for detecting and indicating if the unit is horizontal or vertical such that it enables an offender the ability to put the unit to rest (rest mode) without the assistance of an actual docking station. In addition, where the GPS unit and the tip over switches are placed in a single piece unit the apparatus of the present invention is capable of detecting and indicating whether the monitored person is standing (vertical position) or lying down (horizontal position). The apparatus and method of the present invention comprises at least two tip-over switches (inclinometers). Tip-over switches detect inclination or bend from the vertical position or measure angular tilt with respect to the horizontal plane. Tip-over switches could be oriented vertically or horizontally and are provided with diverse tilt angle ranges. A tip-over switch supplies angular-specific data regarding the inclination of the monitored body from the vertical plane in order to enable some pre-defined response. Similarly, when used in conjunction with a security personnel monitoring application, the tip-over switch provides indication regarding the orientation of the monitored unit only, such that the unit at some point in time is in vertical or in horizontal position. The use of the at least two tip-over switches in combination with a controller enables the determination whether the unit worn or carried by a monitored individual is in motion or not. The determination as to the movement is deduced from the input received from the two tip-over switches, each having a different inclination determining capabilities. Thus, without using a motion sensor, such as a 3 degree motion detector and without the use of an inertial detector the apparatus and method of the present invention provide the position of the monitored individual and whether such individual has changed his position.

Figure 1:
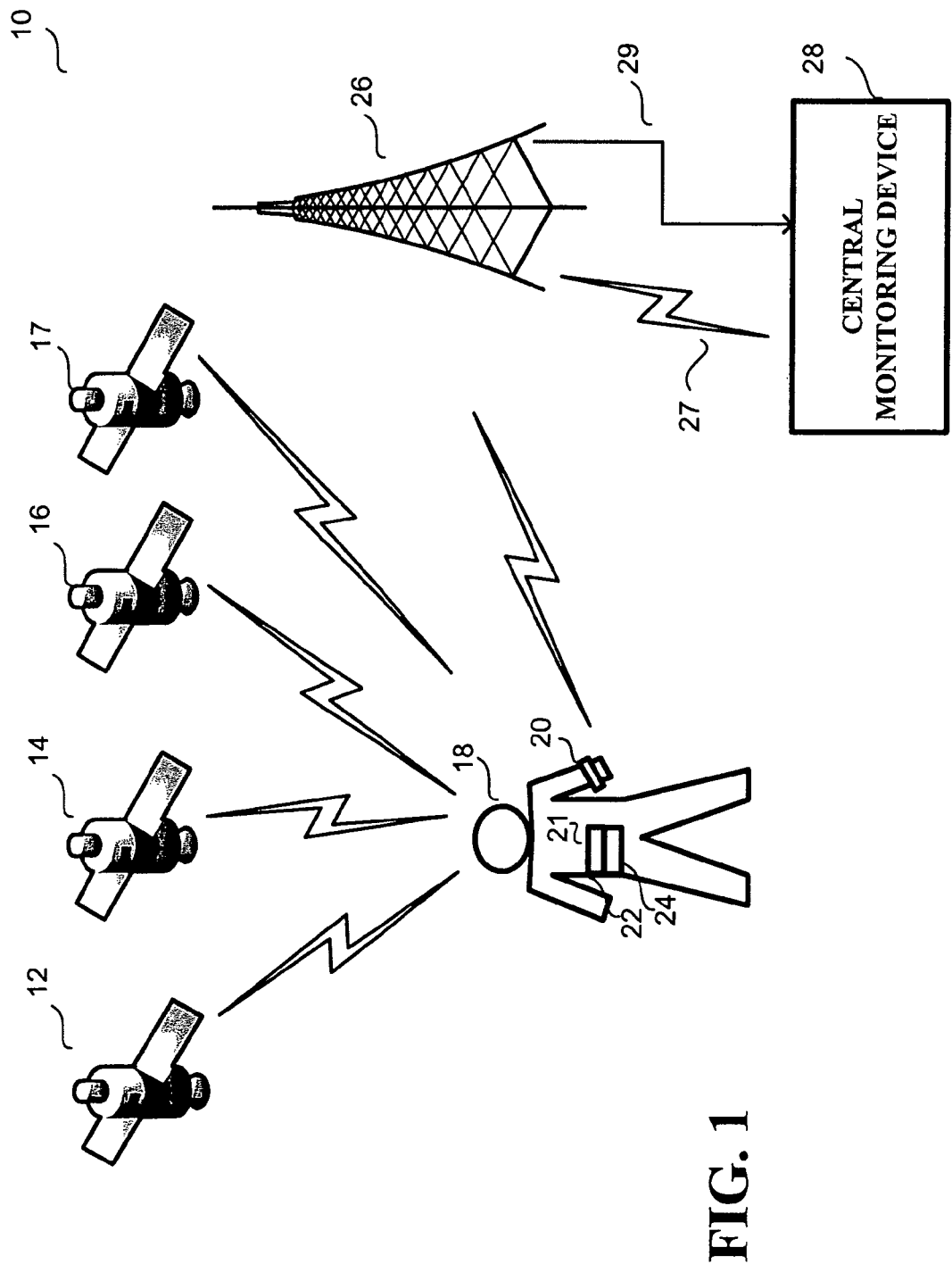
FIG. 1 is a schematic illustration of a system environment in which the proposed apparatus and method could operate, in accordance with the preferred embodiment of the present invention.

Referring to FIG. 1 that illustrates an exemplary system environment 10 in which the proposed apparatus and method could operate, in accordance with the preferred embodiment of the present invention. The system environment 10 constitutes a remote monitoring system preferably for law enforcement and specifically configured for remotely tracking and monitoring a plurality of persons, such as movement-restricted and location-restricted criminal offenders, persons charged and released on bail, other offenders or suspected offenders placed on a monitoring watch, and the like. The system environment 10 includes a monitored person 12, a cellular base station or cellular repeater 26, a central monitoring device 28 and several Global Positioning System (GPS) satellites 12, 14, 16, and 17. An electronic tag is configured as a tamper-proof, optionally non-removable, body-worn portable tracking device 20. The electronic tag 20 is attached permanently to the body of the monitored person 18. A body-worn removable portable tracking and reporting device 21 is periodically attached to the body of the monitored person 18. The tracking and reporting device 21 includes a Global Positioning System (GPS) signal handler unit 22 for communication with the Global Positioning System (GPS) satellites 12, 14, 16, and 17 and for the processing of the Global Positioning System (GPS) signals and a cellular signal handler 24 for the handling of a wireless cellular signal including monitoring information and for subsequent wireless cellular communication of the wireless cellular signal to the central monitoring device 28 via the cellular base station/repeater 26. The connection between the central monitoring device 28 and the cellular base station/repeater 26 can be performed wirelessly 27 via the air medium or via a land line 29. The non-removable, body-worn portable tracking device (electronic tag) 20 is in short-range wireless communication with the tracking and reporting device 21. The function of the electronic tag 20 is to communicate with the tracking and reporting device 21 by sending wireless signal indicating the status of the tag 20, such as reporting on attempts for the removal of the tag 20 from the body of the monitored person 18 or reporting potential tampering efforts with the tag 20. The GPS signal handler and processor 22 of the tracking and reporting device 21 is responsible for determining the geographical location of the monitored person 18 via the Global Positioning System (GPS) that includes the GPS satellites 12, 14, 16, and 17. The cellular signal handler 24 encodes monitoring data or alert data received from the electronic tag 20 and the GPS signal handler 22 into a cellular signal which is subsequently communicated to the central monitoring device 28. The electronic tag 22 and the cellular signal handler could be installed in two separate devices or could be installed in a single device. Note should be taken that in a realistic environment a plurality of monitored persons associated with a plurality of electronic tags and tracking and reporting devices could be tracked by one or more central monitoring devices via one or more cellular base station.

Still referring to FIG. 1 in the preferred embodiment of the present invention, the monitoring information encoded into the cellular signals includes tracking and status data provided by the electronic tag 20, location data provided by the GPS signal handler 22 and device attitude data provided by a device attitude monitor (not shown) incorporated into the tracking and reporting device 21. A more detailed description of tracking and reporting device 21 will be provided herein under in association with the following drawings.

The tracking and reporting device 21 could be incorporated into the electronic tag 20. In such a case, the GPS signal handler 22 could be receiving the GPS signals from the GPS satellites 12, 14, 16, and 17 directly within the electronic tag 20 and the cellular signal handler 24 could communicate with the central monitoring device 26 directly from the electronic tag 20 via the cellular base station/repeater 26.

Figure 2:
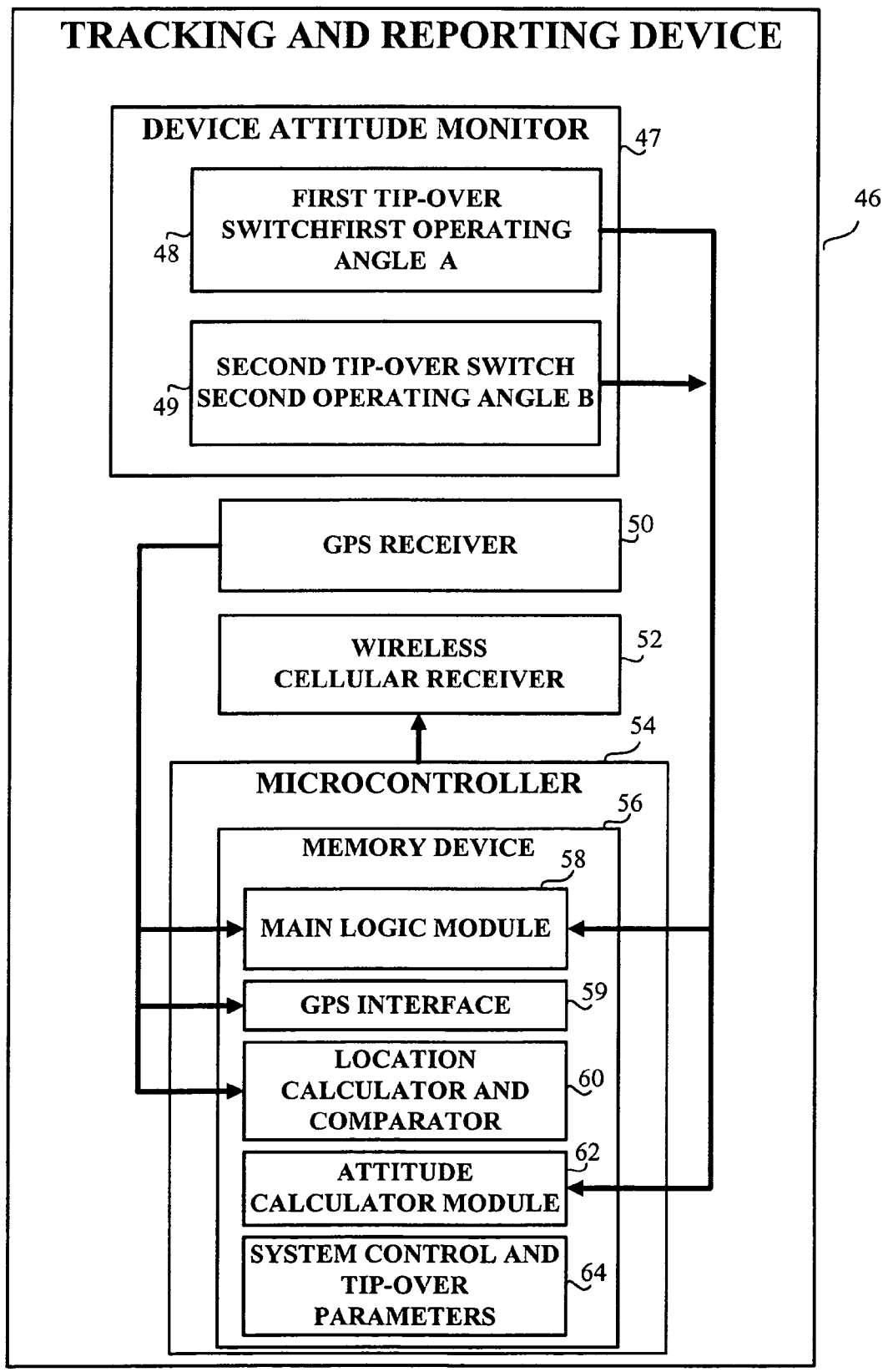
FIG. 2 is a schematic block diagram of the tracking and reporting device, in accordance with the preferred embodiment of the present invention.

Referring now to FIG. 2 the tracking and reporting device 46 includes a device attitude monitor 47, a Global Positioning System (GPS) receiver 50, a wireless cellular receiver 52, and a microcontroller 54 that includes a memory device 56. The device attitude monitor 47 equipped with two angular sensors: a first tip-over switch 48 with a pre-defined first operating angle A, and a second tip-over switch 49 with a second pre-defined operating angle B. In the preferred embodiment of the present invention, the first operating angle A is about 5 degrees and the second operating angle B is about 25 degrees. In another preferred embodiment of the present invention, the first operating angle A is about 7 degrees and the second operating angle B is about 23 degrees. In yet further embodiments of the present invention, the first operating angle A could be set to a value between about 5 degrees and about 14 degrees and the second operating angle B could be set to a value between about 15 degrees and about 30 degrees. The first tip-over switch 48 and the second tip-over switch 49 are used in combination to assess whether the tracking and reporting device 46 is in the typical horizontal resting position or in the vertical position. The first tip-over switch 48 and the second tip-over switch 49 are both relative to the horizontal axis. The first tip-over switch 48 and the second tip-over switch 49 are both circular where the angle is measured around a vertical axis in a circular manner. According to the tilt angle and the output of both tip-over switches 48, 49 will be either zero or one at times where one is achieved if the angle is above the pre-defined switch-specific angle threshold. Thus, the first tip-over switch 48 will output zero (0) if the angle measured is less than the first number of degrees of inclination A and will output one (1) if the angle measured is greater than the first number of degrees of inclination A. The second tip-over switch 49 will output zero (0) if the second number of degrees of inclination angle measured is less than B and will output one (1) if the second number of degrees of inclination measured is greater than B. The tip-over switches in combination will generate a zero (0) value when the tracking and reporting device 46 is in a horizontal orientation and will generate a value of one (1) when the tracking and reporting device in a vertical orientation. The tip-over status (zero or one) is checked at a time interval, such as about every second relative to the last second. Alternative time intervals could be used where the length of the interval could be from about 0.1 second up to about 20 seconds. The attitude monitor 47 (together with the entire tracking and reporting device 46) could be either in a vertical orientation or in a horizontal orientation. In order to determine the tip-over status the following is checked every pre-determined interval a) the output of the second tip-over switch 49 (0 for less than B 1 for greater than B), b) the number of transitions of the first tip-over switch 48 from less than A (status of 0) to greater than A (status of 1) where the number of transitions is collected into a pre-determined tip-over counter. The counter scale is incremented or decremented in accordance with the tip-over status. Note should be taken that other preferred embodiments of the present invention, the operating angles of the first tip-over switch and/or the second tip-over switch could be dynamically determined and dynamically loaded in accordance with the type of application and operating circumstances.

Still referring to FIG. 2 the GPS receiver 50 receives geographical location data from the Global Positioning System (GPS) satellites 12, 14, 16, and 17 of FIG. 1, processes the location coordinates, and conveys the location information to the location calculator and comparator 60. The wireless cellular receiver 52 receives monitoring status data of the electronic tag 20 of FIG. 1, receives location data based on the Global Positioning System (GPS) receiver 50 readout and device attitude data of the attitude monitor 47. The monitoring status data includes unit status, tamper status and other data relating to the monitoring. The data is encoded into a wireless cellular signal and transmitted through a cellular antenna (not shown) and the air interface to the central monitoring device 26 of FIG. 1 via the cellular base station 26 of FIG. 1 Several software modules, such as a main logic module 58, a GPS interface 59, a location calculator and comparator 60, an attitude calculator 62 and a set of system control and tip-over parameters 64 are stored on the memory device 56 to be loaded into the processor of the microcontroller 54 for execution. Alternatively, the main logic module 58, the GPS interface 59, the location calculator and comparator 60, and the attitude calculator 62 could be installed directly into the hardware circuits of the microcontroller 54. The main logic module 58 is responsible for the sequencing and controlling of operations of the device 46. The GPS interface 59 controls the operation of the GPS receiver 50. The interface 59 is capable of disabling or activating the GPS receiver 50. The location calculator and comparator 60 is responsible for the processing of the GPS coordinates received from the GPS receiver 50 for checking the coordinates against a pre-defined set of control parameters 64 in order to determine whether the monitored person 18 of FIG. 1 is in a forbidden location and for conveying the encoded location information to the wireless cellular receiver 28. The function of the wireless receiver 52 is to transmit a cellular signal that carries the encoded monitoring information to the central monitoring unit 28 of FIG. 1.

Figure 3A:
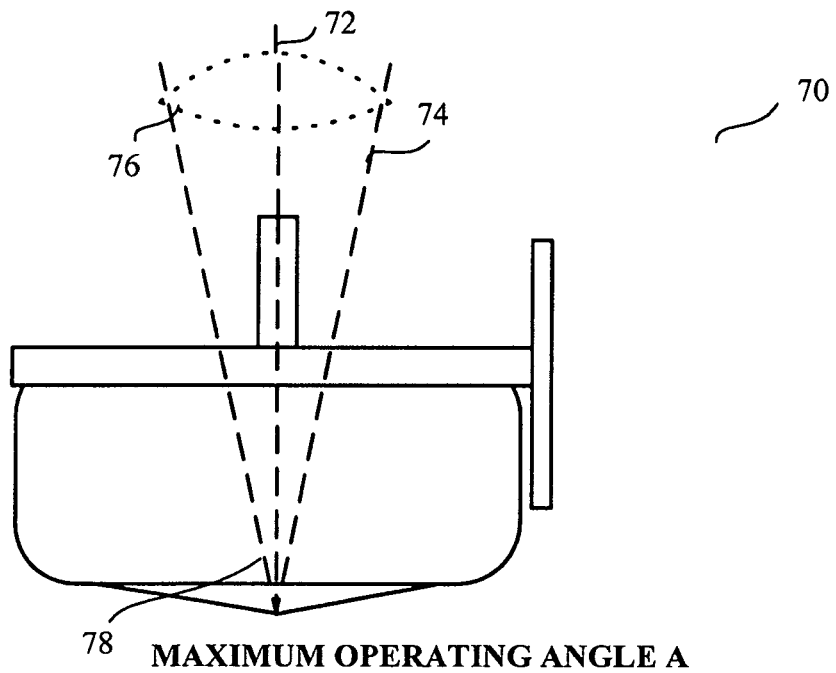
FIG. 3A is side view of the first tip-over switch, in accordance with the preferred embodiment of the present invention.
Figure 3B:
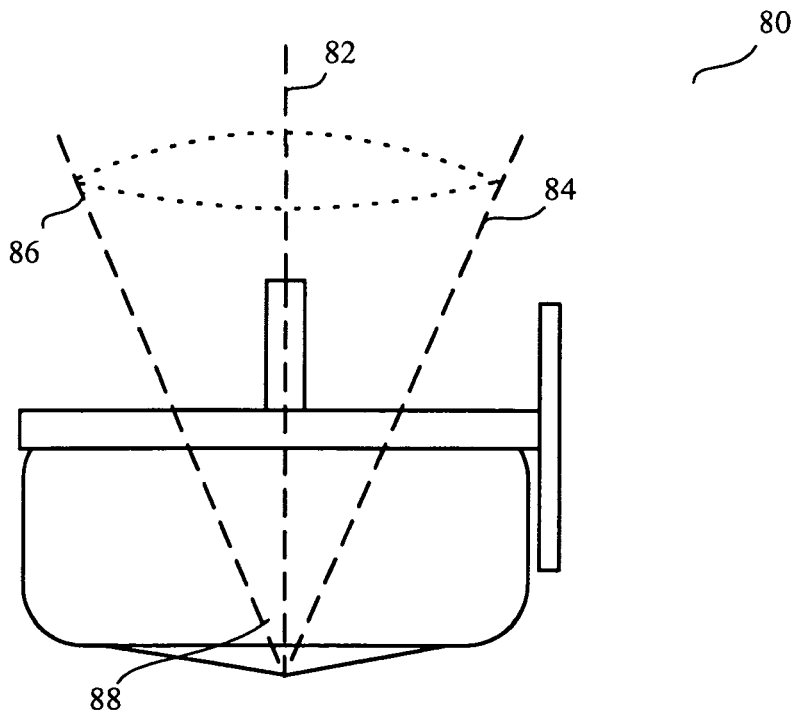
FIG. 3B is a side view of the second tip-over switch, in accordance with the preferred embodiment of the present invention.

Referring now to FIG. 3A-3B, that show the first and the second tip-over switches 70 and 80, respectively. In the preferred embodiment of present invention, the tip-over switches 70 and 80 are installed in the tracking and reporting device 46 of FIG. 1. Tip-over switches operate when the switch is tilted from the vertical position. The angle through which the switch has to move before operating is called the operating angle. The switches 70 and 80 are omni-directional inclinometer devices that measure angular tip-over with respect to the horizon. The maximum operating angle ranges 74-76 and 84-86, respectively, are the ranges of the desired linear output measured in degrees. In the preferred embodiment of the present invention, the maximum operating angle of the first tip-over switch 70 is A while the maximum operating angle of the second tip-over switch 80 is B The switches 70 and 80 are adapted such that for the first tip-over switch 70 an output of less than A degrees is converted into the pre-defined value of 0 (zero) and an output of more than A degrees is converted into the pre-defined value 1 (one) while for the second tip-over switch 80 an output of less than B degrees is converted into the pre-defined value of 0 (zero) and an output of more than B degrees is converted into the pre-defined value 1 (one). The first and second tip-over switches 70 and 80 could use any of the common tilt sensor technologies, such as accelerometer, capacitive, electrolytic, gas bubble in liquid, mercury, pendulum, and the like. In the preferred embodiment of the present invention, the electrical outputs for the first and second tip-over switches 70 and 80 are switched, such as to provide the values of 0 and 1 in accordance with the tilt angle achieved. The first and second tip-over switches 70 and 80 could be a variety of devices including sensor element or chip, sensor or transducer, instrument or meter, gauge or indicator, and recorder and totalizers. In some preferred embodiment of the present invention the second tip-over switch 80 could include a recorder or totalizer to record, totalize and track measurements over time. In other preferred embodiments of the present invention the recorder and the totalizer could be external to the second tip-over switch 80.

Figure 4:
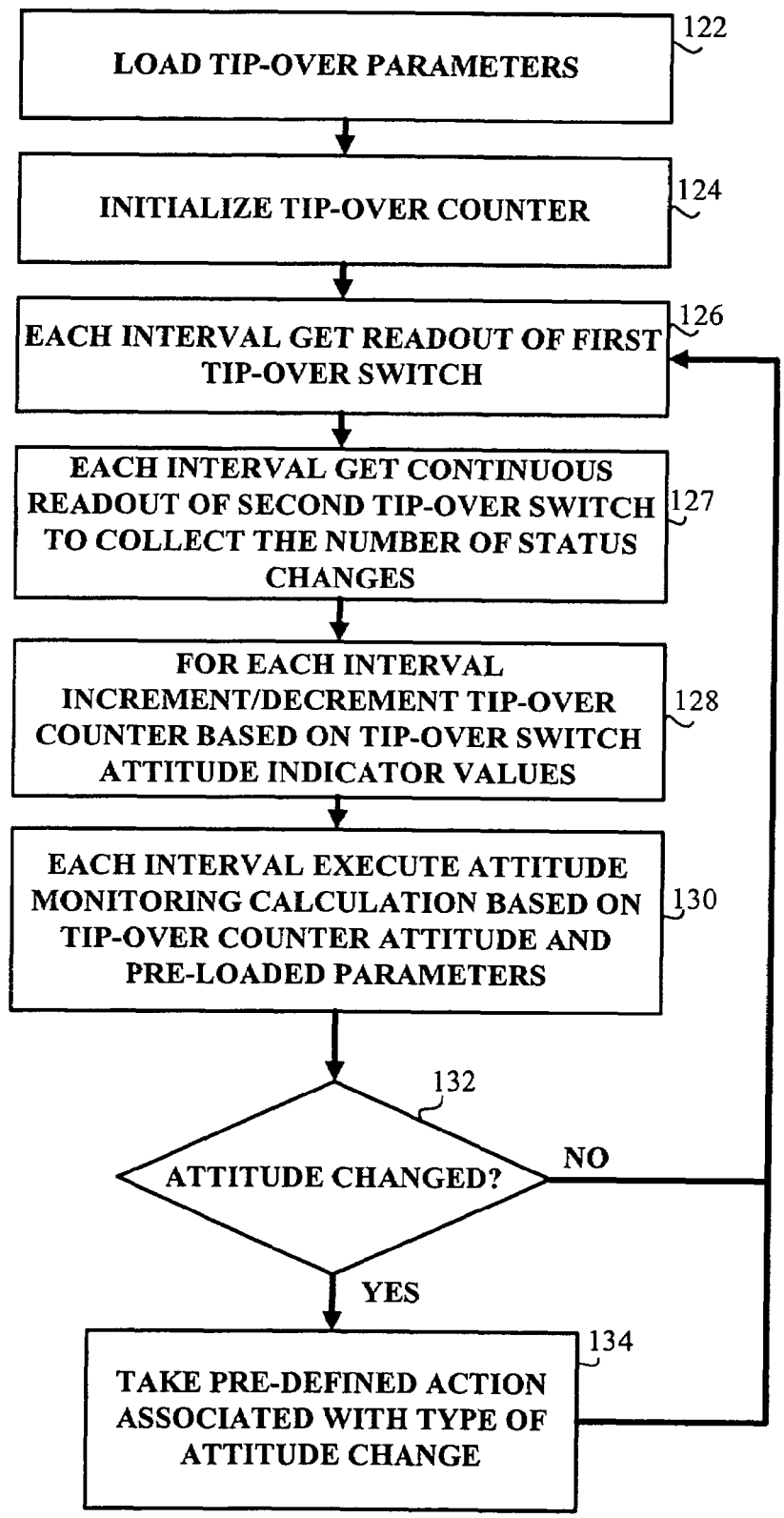
FIG. 4 is a simplified flowchart illustrating the method for processing the tip-over data in association with the tip-over counter, in accordance with the preferred embodiment of the present invention.

Referring now to FIG. 4 that illustrates the method for processing the tip-over data in association with the tip-over counter and the pre-loaded tip-over parameters. At step 122 the tip-over parameters 64 are loaded from the memory device 56 of FIG. 2 and at step 124 the tip-over counter is initialized in accordance with the status of the tip-over switches in combination. The tip-over parameters 64 include the tip-over counter scale control values, such as a) minimum counting value, b) maximum counting value, c) low transition value, and d), high transition value. Each of these parameters has a specific and well-defined function in the determination of the tip-over status. The minimum counting value parameter and the maximum counting value parameter define the operating limits or counter scale boundaries of the tip-over counter. The transition points are orientation transition points. The tip-over status could be one of the two following states: a) vertical orientation, or b) horizontal orientation. It is pre-determined that when the value of the tip-over counter exceeds the high transition point then the tip-over status changes to vertical. Similarly, it is pre-determined that when the value of the tip-over counter gets below the low transition point then the tip-over status changes to horizontal. The tip-over parameters could be dynamically controlled and subsequently downloaded to the tracking and reporting device 46 of FIG. 2. In order to check the tip-over status at step 126 during pre-defined period a pre-defined number of readouts are obtained from the first tip-over switch (with the first operating angle of A). In the preferred embodiment of the present invention, the pre-defined period is one second. In other preferred embodiments of the invention, various other periods could be used, such as 0.1 second, 2 seconds, 20 seconds, and the like. Thus, in the preferred embodiment of the present invention, at step 127 for each second the second tip-over switch (with the second operating angle of B) is checked once. The number of times the status of the first tip-over switch has been changed is collected and stored into a tip-over transitions counter. At step 128 for each second the tip-over counter is incremented or decremented inside the scale boundaries based on the tip-over status. At step 130, a specific device attitude monitoring calculation is performed where the calculation is based on the pre-loaded tip-over parameters, on the value of the tip-over counter, and the value of the tip-over status. A more detailed description of the device attitude monitoring calculation will be provided herein under in association with the following drawings. The result of the calculation indicates whether there was a device attitude change in either direction, such as from vertical to horizontal or from horizontal to vertical. At step 132 it is determined whether there was a device attitude change. If the result is positive then at step 134 some pre-defined application-specific action is taken which is associated with the direction of the device attitude change (from horizontal to vertical or from vertical to horizontal).

Figure 5:
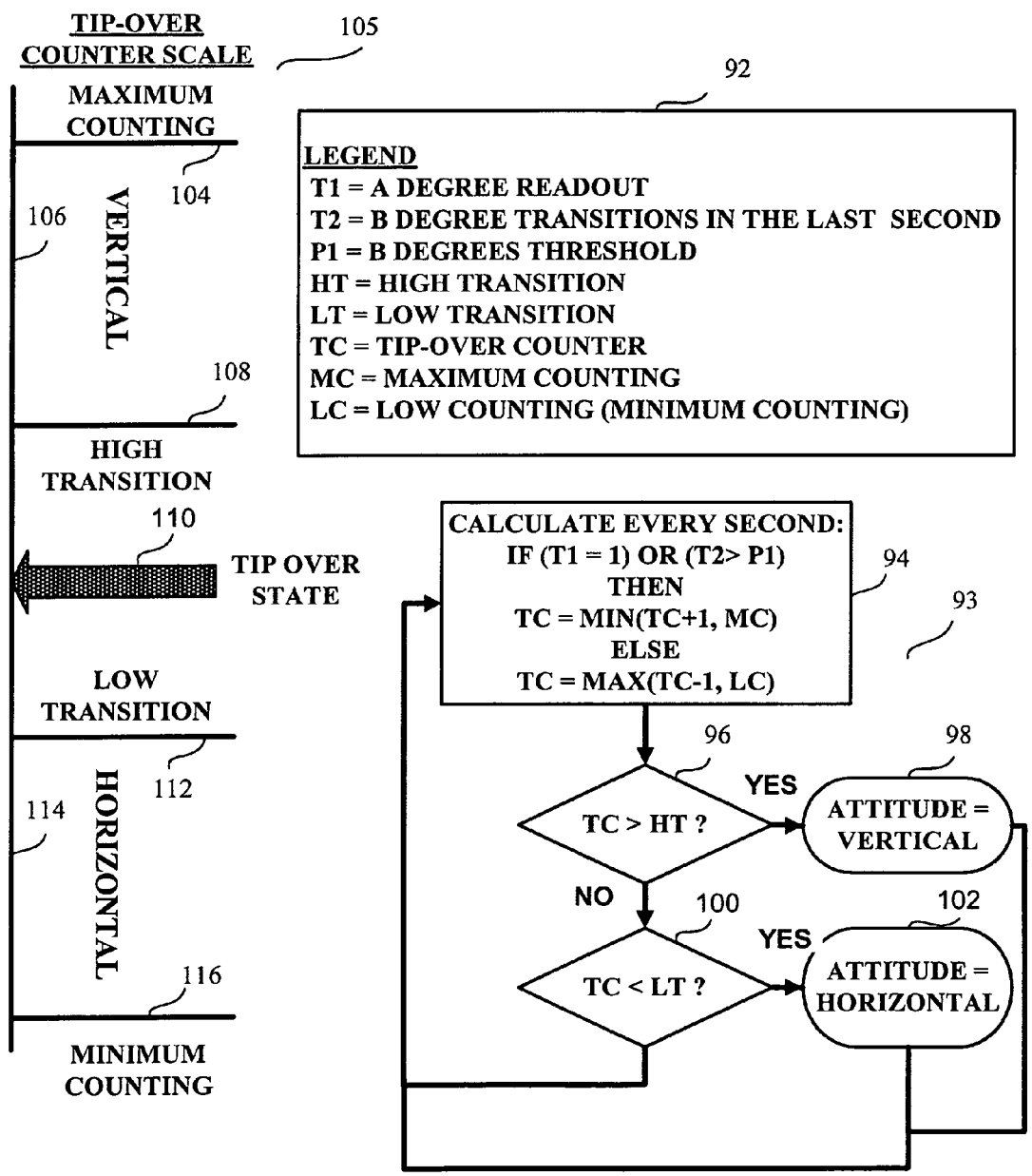
FIG. 5 is illustrates the tip-over counter scale and the device attitude change calculations, in accordance with the preferred embodiment of the present invention.

FIG. 5 shows the tip-over counter numerical scale 105, which is illustrated in a graphical manner. In addition, FIG. 5 shows a simplified flowchart of the device attitude (tip-over status or tip-over state) changes calculations 93 alongside a list of variables and pre-loaded parameters 92 that are used in the calculations 93. The tip-over counter is incremented or decremented according the tip-over status by the number of status changes per second indicated by the first tip-over switch (operating angle A degrees) and by the second tip-over switch (second operating angle B). The direction of the operation depends on the tip-over state. Thus, when the tip-over state is horizontal the value of the counter increases, while in the vertical state the value of the counter decreases. There are specific values referred to as points on the graphically represented counter scale that are defined by the pre-loaded tip-over parameters. The parameters are as follow: a) maximum counting point 104, b) high transition point 108, c) low transition point 112, and d) minimum counting point 116. The various points enclose specific conceptual numeric value segments along the tip-over counter scale. It is pre-defined that along the conceptual numeric value segment 106 (a set of counter values) which is located between the value referred to as the maximum counting point 104 and the value referred to as the high transition point 108 the tracking and reporting device is in the vertical position. It is also pre-defined that within the conceptual numerical segment 114 (a set of values) which is located between the value referred to as the low transition point 112 and the value referred to as the minimum counting point 116 the device is the horizontal position. The set of values located between a first value, referred to as the high transition point 108, and a second value, referred to as the low transition point 112, the tracking and reporting device is in a tip-over state 110. Every second the number of status changes of the first tip-over counter (A degrees) are collected and added to the value of the tip-over transitions counter. Subsequently, every second the device attitude monitoring calculation 93 is performed. At step 94 it is determined whether the value of the second tip-over counter is one (tilted more than B degrees) or the value of the tip-over transitions counter is greater than the threshold of the first tip-over counter (A degrees). If the result is positive then the value of the tip-over counter is either remains unchanged if the value of the tip-over counter equals to the maximum counting point 104 or else increased by one. If the value of the result is negative then the value of the tip-over counter is either remains unchanged if the value of the tip-over counter equals to the minimum counting point 116 or else decreased by one. If the value of the tip-over counter is less than the minimum counting point 116 then the value of the tip-over counter is set to the value of the minimum counting point 116. At step 96 it is determined whether the value of the tip-over counter is greater than the high transition point 108. If the result is positive then at step 98 the attitude (tip-over state) is set to vertical. If the result of step 96 is negative then at step 100 it is determined whether the value of the tip-over counter is less than the low transition point 112. If the result is positive then the tip-over status of the tracking and reporting device is set to horizontal. Note should be taken that the above method not necessarily indicates an attitude change. In order to determine that an attitude change have been taken place the current status should be compared to the previous status.

A traditional docking station is an electro-mechanic apparatus that detects the attitude of a monitored unit inserted there into. The traditional docking station provides full control over monitored individuals where GPS reception is not available or where GPS usage and energy consumption should be limited. In the preferred embodiment of the invention, the combination of the two tip-over switches and the controller device provide a "virtual docking" mechanism that allow for the operation of a "virtual docking station". When tip-over status of the tracking and reporting device is detected to be horizontal then the device enters a "rest mode" where the rest mode is associated with "virtual docking mode". In virtual docking mode the device is assumed to be inserted into a "virtual docking station", such that the simulation of a traditional docking station is achieved. Note should be taken that "virtually docking" the tracking and reporting device of a two-piece tracking equipment (separate tracking unit and electronic tag) can be applied to a single-piece tracking equipment. A single-piece tracking equipment comprises a single unit permanently attached to a body part, such as the ankle of the monitored individual. When the monitored person stands, walks or seats, the attitude of the single-piece device is vertical, whereas when the monitored person lies down the device attitude becomes horizontal.

Figure 6:
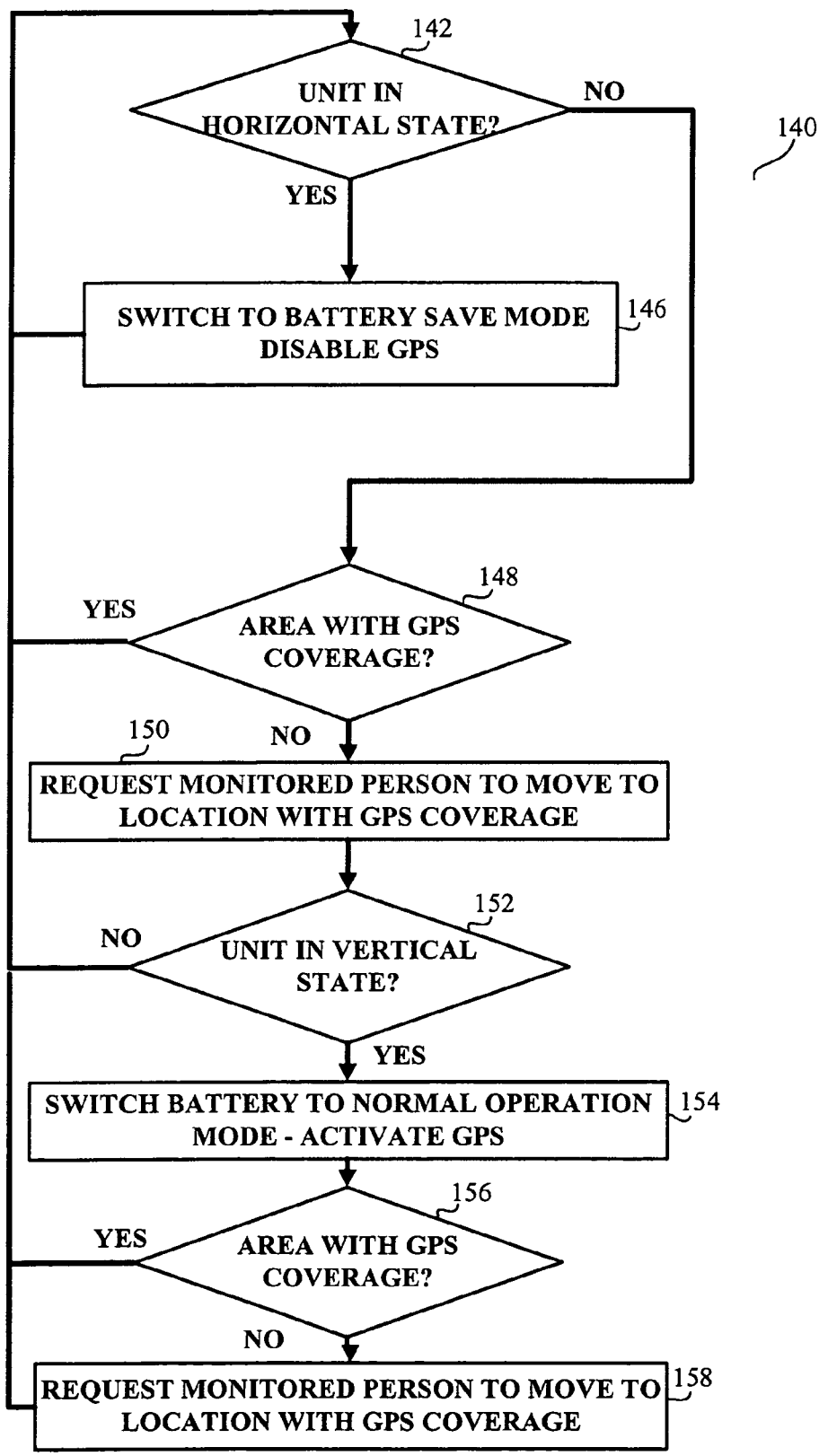
FIG. 6 is a simplified flow chart of illustrating an exemplary method for the application of the proposed apparatus, in accordance with the preferred embodiment of the present invention

Referring now FIG. 6 that shows an illustrative method for an illustrative application that could utilize the proposed apparatus, in accordance with a preferred embodiment of the present invention. The illustrative application is a remote personal monitoring system that tracks and monitors a criminal offender legally enforced to be under surveillance, and legally ordered to comply with specific well-defined rules of behavior, such as, for example, to avoid certain geographical locations, to remain at specific periods of the day at a pre-determined geographical location, such as a private dwelling place, a hotel or the like. In the preferred embodiment of the present invention, the criminal offender (monitored person) is equipped with a body-worn, non-removable, portable electronic tag and a body-worn portable tracking and reporting device. The electronic tag transmits specific monitoring data, such as removal efforts, tampering attempts, and the like to the tracking and reporting device. The tracking and reporting device incorporates a device attitude monitor that includes two tip-over switches the attitude thereof reflects the attitude of the device which is either attached or non-attached to the body of the monitored person. The tracking and reporting device further incorporates a Global Positioning System (GPS) receiver and an associated location calculator and comparator for determining the geographical location of the monitored person. The tracking and reporting device further incorporates a wireless receiver to communicate the monitoring data, location data and device attitude data to a central monitoring device and to receive specific control and command messages from the central monitoring device. The method for the specific application is based on the assumption that the co-operation of the monitored person is assured where co-operation means complying with certain pre-defined rules of behavior. The illustrative rules of behavior for the monitored person include rules for the handling of monitoring equipment, such as the electronic tag and the tracking and reporting device. The rules of the behavior state that while the electronic tag should be attached to the body of the monitored person at all times, the tracking and reporting device could be removed as long as the monitored person remain for a pre-defined period in a pre-determined location, such as his dwelling place. The rules include precise instructions in regard of the removal and the consequent positioning of the tracking and reporting device. Thus, it is pre-determined that consequent to the removal of the tracking and reporting device from the body of the monitored person the device has to be positioned in a horizontal orientation on a flat surface and has to be left immobile as long as it is not worn by the monitored person. The rules also state that the monitored person must remain at all times in locations that are covered by the Global Positioning System (GPS) satellites. When it is sensed by the central monitoring device that the Global Positioning System (GPS) signals indicating the location of the monitored person are lost then the monitored person is compelled to move in order to seek out a location covered by the Global Positioning System (GPS), such that the GPS signal reception is properly restored.

Still referring to FIG. 6, the illustrative method is performed by a computer program module loaded from the memory device 56 of FIG. 2 and executing in the microcontroller 54 of FIG. 2 that is installed in the tracking and reporting device 46 of FIG. 2. Note should be taken that the computer program module could be incorporated directly into the hardware circuits of the microcontroller 54. The operation of the method is described via the simplified flowchart 140. The module is designed for the illustrative application utilizing the illustrative rules of behavior. Note should be taken that the module performs no motion monitoring. It is generally assumed that in the vertical orientation the tracking and reporting module is in motion and in the horizontal orientation the device is at rest. For example, when it is determined by the device attitude monitoring calculation that the orientation of the tracking and reporting device changes from the horizontal state to the vertical state then it is implicitly assumed that the device is in motion. In contrast, consequent to orientation change from the vertical state to the horizontal state it will be assumed that the device is not in motion. The operation of the module is as follows: At decision step 142 it is determined whether the tracking and reporting device in a horizontal orientation by testing the attitude indicator value generated by attitude determination calculation based on the value of the tip-over counter, the status of the first tip-over switch (operating angle A) and the status of the second tip-over switch (operating angle B) in combination. If the result of decision step 142 is positive then step 146 the tracking and reporting device is instructed to enter into battery save mode and an instruction is conveyed to the GPS interface to disable the GPS receiver. Consequently, program control proceeds to step 142.

Still referring to FIG. 6 if the result of decision step 142 is negative then at decision step 148 it is examined whether the location in which the tracking and reporting device operates is in an area with GPS coverage and whether a usable GPS signal is received. If the result of decision step 148 is positive then program control proceeds to decision step 142. If the result of decision step 148 is negative then at command step 150 a request message optionally accompanied with an alarm signal is generated by the tracking and reporting device. The message includes a request for the monitored person to move in order to seek out a location with proper GPS signal reception. Consequently, at decision step 152 it is determined whether the tracking and reporting device in a vertical orientation. If the result of decision step 152 is negative then program control proceeds to decision step 142. If the result the result of decision step 152 is positive then at command step 154 the battery of the tracking and reporting device is instructed to enter full operational mode and the GPS interface is re-activated. Consequently, at decision step 156 it is examined whether the location in which the device operates is in an area with GPS coverage and whether a usable GPS signal is received. If the result of decision step 156 is positive then program control proceeds to decision step 142. If the result of decision step is negative then at command step 158 a request message optionally accompanied with an alarm signal is generated the tracking and reporting device. The message includes a request for the monitored person to move in order to seek out a location with proper GPS signal reception. Consequently, program control proceeds to decision step 142.

During extended periods of utilizing the tracking device, the monitored person could attempt to explore the behavior and thresholds of the "virtual docking" feature and could be tempted to explore methods capable of deceiving the mechanism. For example, the monitored person may attempt to move horizontally the device without crossing the transition point T2 (92 of FIG. 5). The monitored person may also attempt to moving the device non-horizontally consequently leveling the device on a flat surface before the high transition point 92 of FIG. 5 has occurred and the device attitude has been detected as vertical. In order to counter the threat of the deceptions the apparatus is capable or randomly or by request to change the behavior of the "virtual docking" mechanism. Several "utilization profiles" will be stored as parameters in a central database of the central monitoring device where each profile contains a different set of attitude decision taking parameters (P1, HT, LT, MC, LC 92 of FIG. 5). On a random basis or according to a request a new profile shall be downloaded via the cellular network into the tracking device resulting in immediate change in the "virtual docking" characteristics. The various profiles could alternatively be stored in the memory device of the tracking and reporting device and could be randomly switched without the need to be remotely downloaded.

It will be appreciated by persons skilled in the art that the present invention is not limited to what has been particularly shown and described hereinabove. Rather the scope of the present invention is defined only by the claims which follow.

We claim:

1. An attitude detector for determining a horizontal resting orientation or a non-horizontal orientation of a monitoring device, the monitoring device is associated with a tracked person, the detector comprising:
    a first tip-over switch of a first operating angle; and a second tip-over switch of a second operating angle, said second operating angle is larger than said first operation operating angle, wherein said first and second tip-over switches are coupled to said monitoring device such that a change in orientation of the monitoring device causes an equivalent change in orientation of both said first and second tip-over switches and wherein each of said first and second tip-over switches gives an output signal of a first value when tilted by an angle above its respective operating angle and of a second value when tilted by an angle below its respective operating angle;
    a tip-over transition counter for counting transitions of said first tip-over switch during a predetermined time interval; and
    an attitude calculator module configured to receive readouts of said tip-over transition counter and said second tip-over switch, to calculate a tip-over counter value according to said readouts, and to determine the orientation of said monitoring device based on said tip-over counter value and a set of pre-loaded parameters.

2. The detector of claim 1 wherein the first operating angle is in the range of from about 5 degrees to about 14 degrees.

3. The detector of claim 1 wherein the first operating angle is of about 5 degrees.

4. The detector of claim 1 wherein the first operating angle is of about 7 degrees.

5. The detector of claim 1 wherein the second operating angle is in the range of from about 15 degrees to about 30 degrees.

6. The detector of claim 1 wherein the second operating angle is of about 25 degrees.

7. The detector of claim 1 wherein the second operating angle is of about 23 degrees.

8. The detector of claim 1 wherein said pre-loaded set of parameters includes a transition counter threshold, a high transition limit, a low transition limit, a maximum counting limit and a minimum counting limit.

9. The detector of claim 1 wherein the monitoring unit comprises a location unit and wherein said location unit is inactivated upon determination of a horizontal resting orientation and re-activated upon determination of a non-horizontal orientation.

10. The detector according to claim 9 wherein said location unit is a GPS receiver.

11. A monitoring device associated with a tracked person, the monitoring device comprising:
    a GPS receiver for receiving location coordinates of said monitoring device;
    an attitude detector for detecting a horizontal/non-horizontal orientation of said monitoring device, and
    a control circuit adapted for activating said GPS receiver when the orientation of said device is determined to be non-horizontal and for inactivating said GPS receiver when the orientation is determined to be horizontal
    wherein the attitude detector comprises:
    a first tip-over switch of a first operating angle and a second tip-over switch of a second operating angle, said second operating angle being larger than said first operating angle, wherein both the first and second tip-over switches are coupled to said monitoring device such that a change in orientation of the monitoring device causes an equivalent change in orientation both said first and second tip-over switches and wherein each of said first and second tip-over gives an output signal of a first value when tilted by an angle above its respective operating angle and of a second value when tilted by an angle below its respective operating angle;
    a tip-over transition counter for counting transition of said first tip-over switch during
    a predetermined time interval; and
    an attitude calculator module to receive readouts of said tip-over transition counter and said second tip-over switch, to calculate a tip-over counter value according to said readouts, and to determine the orientation of said monitoring device based on said tip-over counter value and a stored set of predetermined parameters.

12. The monitoring device of claim 11 wherein said device is in short-range wireless communication with an electronic tag worn by the monitored person.

13. The monitoring device of claim 12 wherein said device further includes a communications means for communicating with a central monitoring device.

14. A method for determining a horizontal/non-horizontal orientation of a monitoring device, the monitoring device is associated with a tracked person, the method comprising:
    providing said monitoring device with a first tip-over switch of a first operating angle and a second tip-over switch of a second operating angle such that a change in orientation of the monitoring device causes an equivalent change in orientation of both said first and second tip-over switches, said second operating angle is larger than said first operating angle and each of said first and second tip-over switches output a signal of a first value when tilted by an angle above its respective operating angle and of a second value when tilted by an angle below its respective operating angle; counting transitions of said first tip-over switch during a pre-defined time interval to obtain a first tip-over transitions number;

calculating a tip-over counter value based on (i) a last stored tip-over counter value, (ii) said first tip-over transitions number; and (iii) the output signal of the second tip-over switch; and determining the orientation of said device by comparing said tip-over counter value to a set of pre-loaded parameters.

15. The method of claim 14 wherein said pre-defined time interval is in the range of 1 to 2 seconds.

16. The method of claim 14 wherein the first operating angle is in the range of from about 5 degrees to about 14 degrees.

17. The method of claim 14 wherein the second operating angle is in the range of from about 15 degrees to about 30 degrees.

18. The method of claim 14 wherein said monitoring device includes a location unit and wherein the method further comprises a step of activating or inactivating said location unit upon detection of a transition from horizontal to non-horizontal orientation or from non-horizontal to horizontal orientation, respectively.

* * * * *